(12) United States Patent
Hödl

(10) Patent No.: US 7,150,248 B2
(45) Date of Patent: Dec. 19, 2006

(54) TRAINING AND THERAPY DEVICE FOR DOGS AND HOOFED ANIMALS

(76) Inventor: Thomas Hödl, Wendstattgasse 4/31/17, A-1100 Vienna (AT)

( * ) Notice: Subject to any disclaimer, the term of this patent is extended or adjusted under 35 U.S.C. 154(b) by 0 days.

(21) Appl. No.: 10/864,911

(22) Filed: Jun. 9, 2004

(65) Prior Publication Data

US 2005/0087149 A1   Apr. 28, 2005

(30) Foreign Application Priority Data

Jun. 10, 2003 (AT) ................................. A 901/2003

(51) Int. Cl.
  *A01K 15/02* (2006.01)
  *B68B 1/00* (2006.01)
(52) U.S. Cl. .......................................... 119/818; 54/72
(58) Field of Classification Search ................ 119/818, 119/816; 54/71, 72
  See application file for complete search history.

(56) References Cited

U.S. PATENT DOCUMENTS

| 216,705 | A | * | 6/1879 | Smith ............................. 54/71 |
| 438,360 | A | * | 10/1890 | Phelps ........................... 54/72 |
| 444,387 | A | * | 1/1891 | Harris ............................ 54/72 |
| 444,570 | A | * | 1/1891 | Phelps ........................... 54/72 |
| 580,965 | A | * | 4/1897 | Weathers ........................ 54/71 |
| 597,317 | A | * | 1/1898 | Ellsworth ..................... 119/818 |
| 962,890 | A | * | 6/1910 | Byrd et al. .................. 119/818 |
| 2,534,727 | A | * | 12/1950 | Moyle ............................. 54/71 |
| 2,613,932 | A | * | 10/1952 | Manners ..................... 482/124 |
| 3,994,264 | A | * | 11/1976 | Flynt .......................... 119/815 |
| 4,528,944 | A | * | 7/1985 | Reed et al. .................. 119/702 |
| 5,137,272 | A | * | 8/1992 | Wilkinson .................. 482/124 |
| 5,203,754 | A | * | 4/1993 | Maclean ..................... 482/124 |
| 5,336,151 | A | * | 8/1994 | Van Ballegooie ........... 482/124 |
| 5,511,515 | A | * | 4/1996 | Brown et al. ............... 119/771 |
| 6,354,247 | B1 | * | 3/2002 | Andrews ..................... 119/818 |
| 6,513,461 | B1 | * | 2/2003 | Sala Prat et al. ........... 119/856 |
| 6,551,221 | B1 | * | 4/2003 | Marco .......................... 482/74 |
| 6,708,650 | B1 | * | 3/2004 | Yates ........................... 119/792 |
| 2005/0103283 | A1 | * | 5/2005 | Penzak ....................... 119/816 |

* cited by examiner

*Primary Examiner*—Yvonne R. Abbott
(74) *Attorney, Agent, or Firm*—Kirkpatrick & Lockhart Nicholson Graham LLP

(57) ABSTRACT

The invention concerns an orthopedic training or therapeutic device for dogs, hoofed animals, and camels that consists of at least one elastic band (3), at least over part (5) of its length, and that is fastened on one side to the middle rear paw or middle front paw of the extremity (4) being treated and cooperates on the other side with a chest harness (2) of the animal (1).

Figure 1:
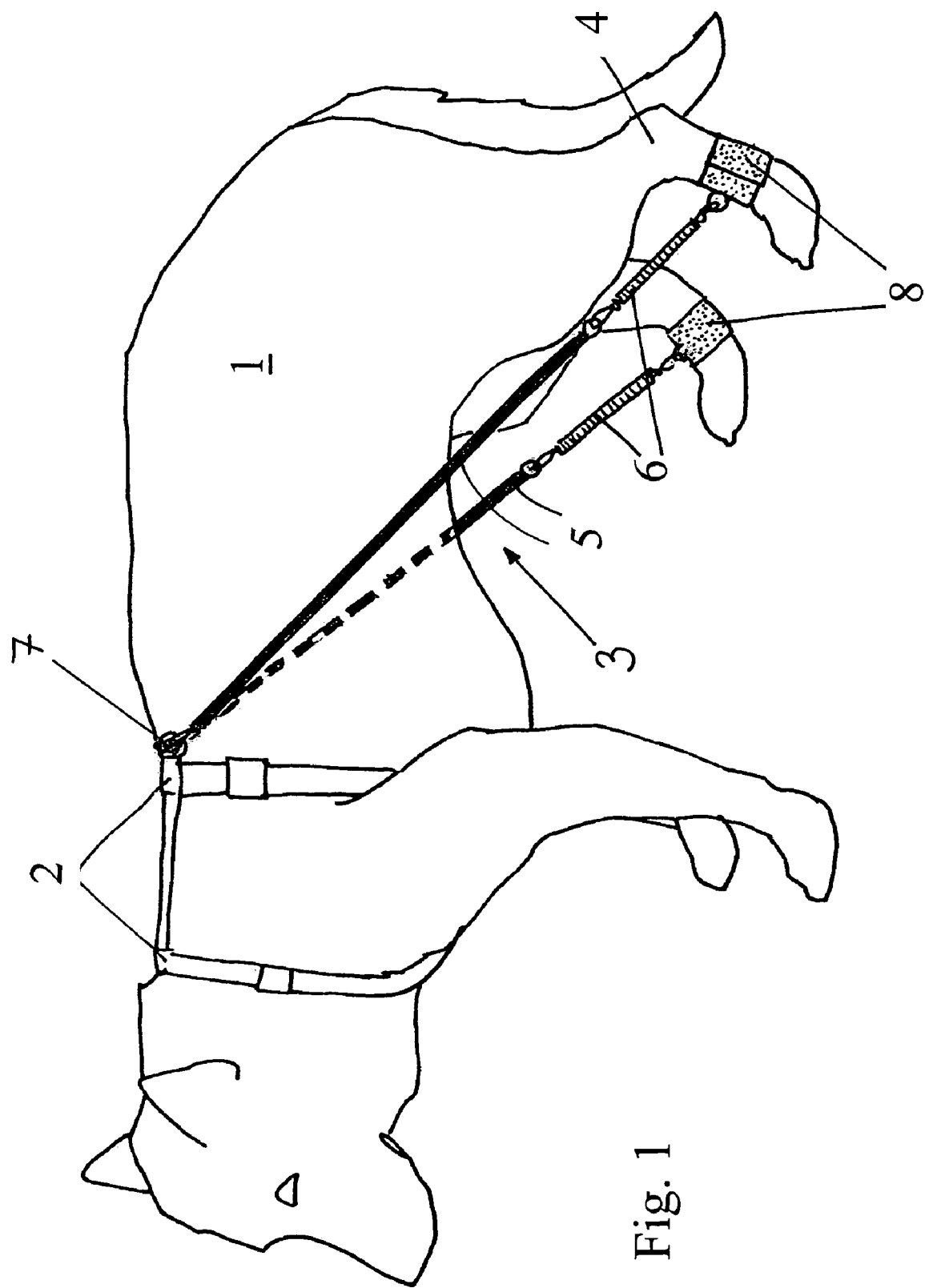

The invention is characterized by the fact that the band (3) is fastened on the other side to a linkage point (7, 7') in the upper area of the chest harness (2) on the withers or on the side.

8 Claims, 6 Drawing Sheets

TRAINING AND THERAPY DEVICE FOR DOGS AND HOOFED ANIMALS

CROSS-REFERENCE TO RELATED APPLICATIONS

This application claims priority under 35 U.S.C. § 119(a) to Austrian Patent Application No. A 901/2003 filed Jun. 10, 2003, now Austrian Patent No. AT500022.

The invention concerns an orthopedic training and therapy device for dogs of all sizes and for hoofed animals, such as cattle, horses, donkeys, mules, etc., and camels, consisting of at least one elastic band at least over part of its length, which is fastened on one side to the extremity being treated and, on the other side, to a chest harness of the animal.

This type of device is known for the training of sporting or working dogs from U.S. Pat. No. 4,528,944 A. The band is then guided from one of the rear legs through a loop on the chest harness between the front legs to the other rear leg and is freely movable in the loop and therefore riot fastened to the harness. As a result of this expedient, the "gallop", with synchronous movement of both rear legs, is prevented or at least hampered, whereas the "trot", in which the forward movement of a rear leg coincides with the backward movement of the other rear leg—and with the entire length of the band therefore hardly changing at all—is made possible. Guiding of the movement of the individual legs is not achieved by this arrangement, and only the muscles are trained.

A small cart for the rear extremities of a lame dog is known from U.S. Pat. No. 3,215,117 A, on which the rear body of the dog rests. The small cart is connected in its lower region near the axle of its wheels, by means of two rods, laterally to the chest harness of the dog, so as not to tilt. Training or exercising of a movement process is not possible with this device.

U.S. Pat. No. 2,534,727 A describes a complicated harness for dogs, consisting of unstretchable belts, with which the dog can be prevented from jumping, running, etc., by adjusting the lengths of the individual belts, so as not to escape from his master. This device cannot be used to exercise a movement process or to support a movement.

Many dog breeds have congenital deformities or have acquired changes in the area of their hip joint, through which, early on, they must assume an incorrect posture and make compensating movements during walking and running. In particular, the area of the rear lumbar vertebrae and the transition to the rump bone are overloaded for years because of this. In later years, undersupply to the nerves of the rear legs can develop from this. This neurological problem initially manifests itself by severe pain in the mentioned section of the vertebral column, later by deviating uncoordinated gait and dragging of one or both rear extremities (dragging with the claws or hooves), since they can no longer be properly raised when the leg is placed forward. Muscle degradation is the result. Later, it is difficult or even no longer possible for the animals to stand up. Such problems also occur, but more rarely, on the front extremities.

These and similar diseases also affect hoofed animals such as cows, horses, and related animals, such as donkeys, mules, and, in zoos, exotic hoofed animals, such as antelopes and camels.

Present therapeutic possibilities in veterinary medicine are restricted, since the symptoms often occur first only relatively late, i.e., at advanced age. Despite massive surgical interventions, the movement process in many cases remains seriously compromised. In cases following surgery and without surgery, despite intensive physical therapy and drug use, euthanasia of the animals is the only alternative.

The purpose of the invention is to achieve a preventive or alleviating, under some circumstances, healing effect with an orthopedic or physical therapeutic device, which is usable even during atactic movement of the legs.

According to the invention, these objectives are achieved in a device of the type mentioned at the outset, in that the band is fastened on the other side laterally or in the upper region in the center of the chest harness.

The length of the band is preferably chosen so that during normal gait at the moment of raising the feet, i.e., in the frontmost position of the extremity with reference to the body, the band is slack. The band is fastened on the leg by means of a foot cuff on the middle front paw, just beneath the carpal joint, or on the middle rear paw, just beneath the ankle joint. The method of action of the device is as follows: the elastic bands or band sections are stretched (biased) when the feet come down and, after raising of the feet, help to lift them from the ground and move them straight forward by their relaxation. The device according to the invention can also be successfully used for the training or therapy of dogs or hoofed animals with other neurological problems, for example, for herniated disks.

The training and exercise purpose pursues increased activity of the thigh, calf, and lumbar musculature during the expansion phase of the rubber band, which is equivalent to putting the feet down to an increasing extent.

The beginning of the foot raising phase, which is initiated by the forward movement phase (hanging leg phase), is supported by slackening of the band (release of kinetic energy from potential energy=elasticity principle). This also applies to the beginning of the forward movement phase of the extremity, but less by momentum support, then by direction support.

Because of this, it is possible for the patient [sick animal] to bring the extremity down in a coordinated manner. The beginning of putting the feet down is carried out by the patient independently, but is supported during the application of both extremities by the other extremity supported by the elastic band in the sense of coordination. Because of this, the uncertainty of the patient when putting the feet down is eliminated and the extremity can be guided rearward again in a coordinated manner.

Because of the band support, during forward movement, the feet describe a higher arc and the animals no longer drag their claws/hooves on the ground. This higher excursion, however, is also achieved by the increased demands on the lumbar musculature, which is achieved by increased reflex activity.

It was surprisingly shown that virtually all animals being treated accept the device without problems and even after a few steps experience a pleasant effect. After a few application sessions, most animals exhibit an improved gate and walking behavior even without the orthopedic training device.

Figure 2:
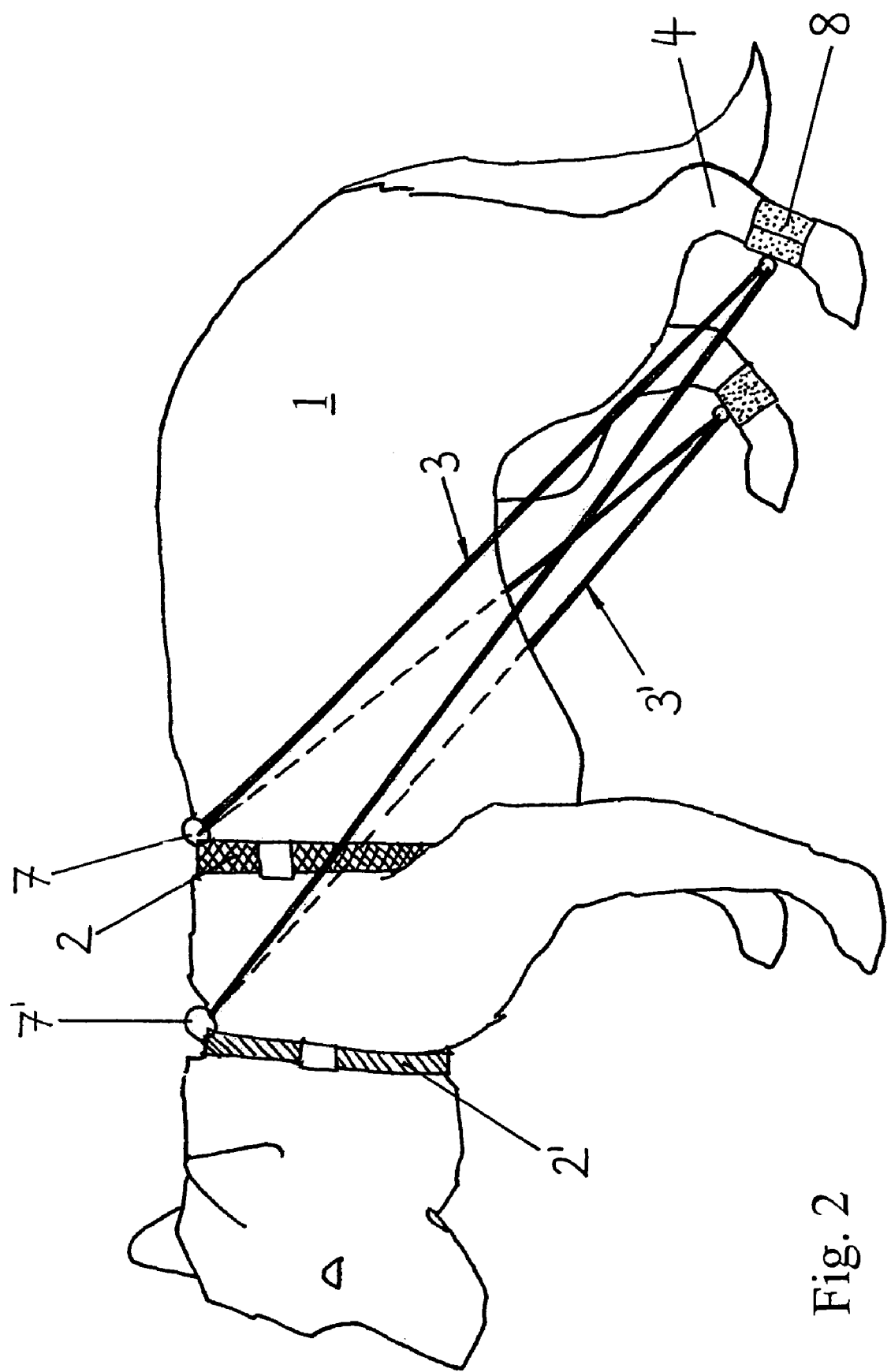
Figure 3:
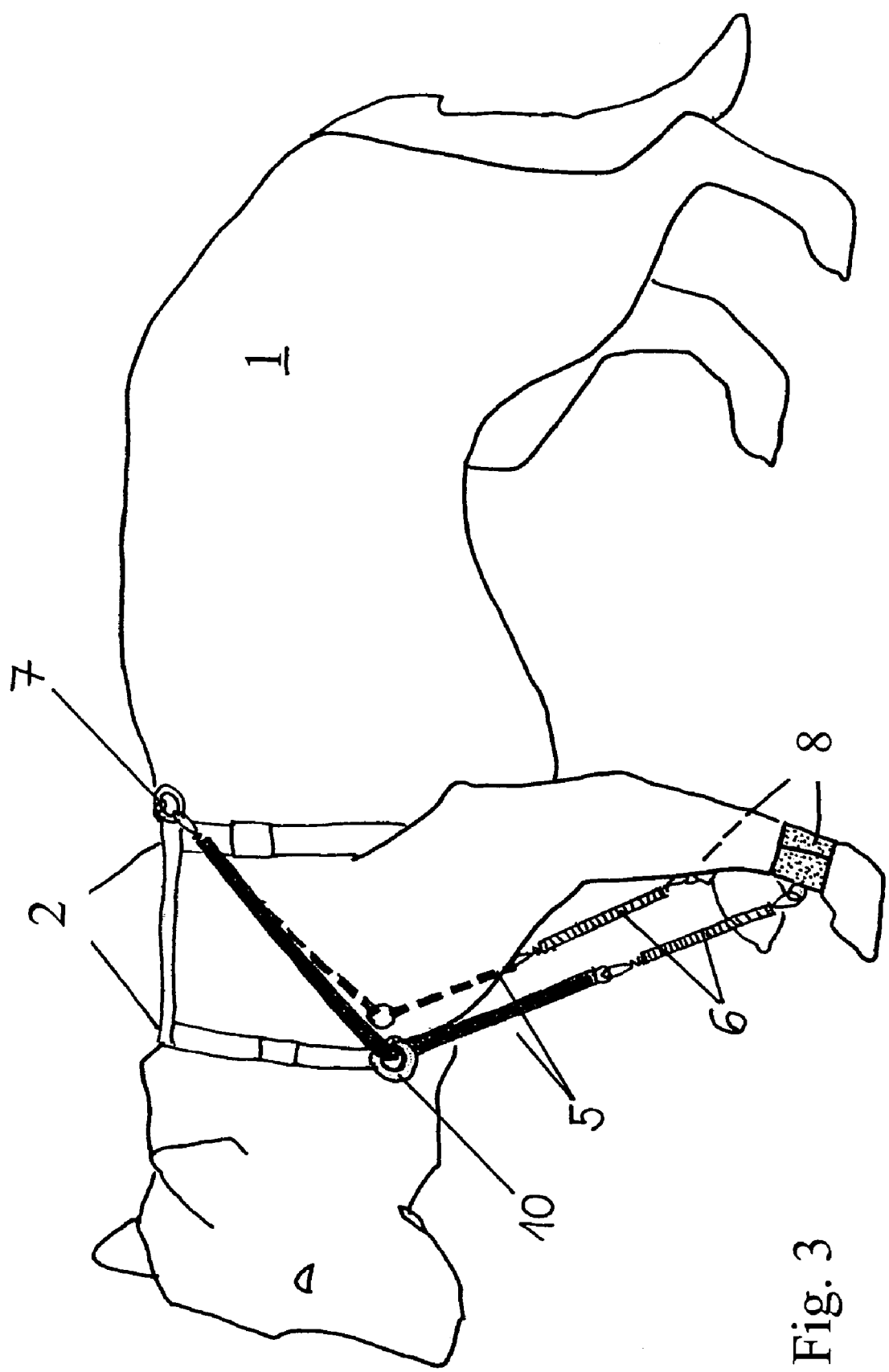
Figure 4:
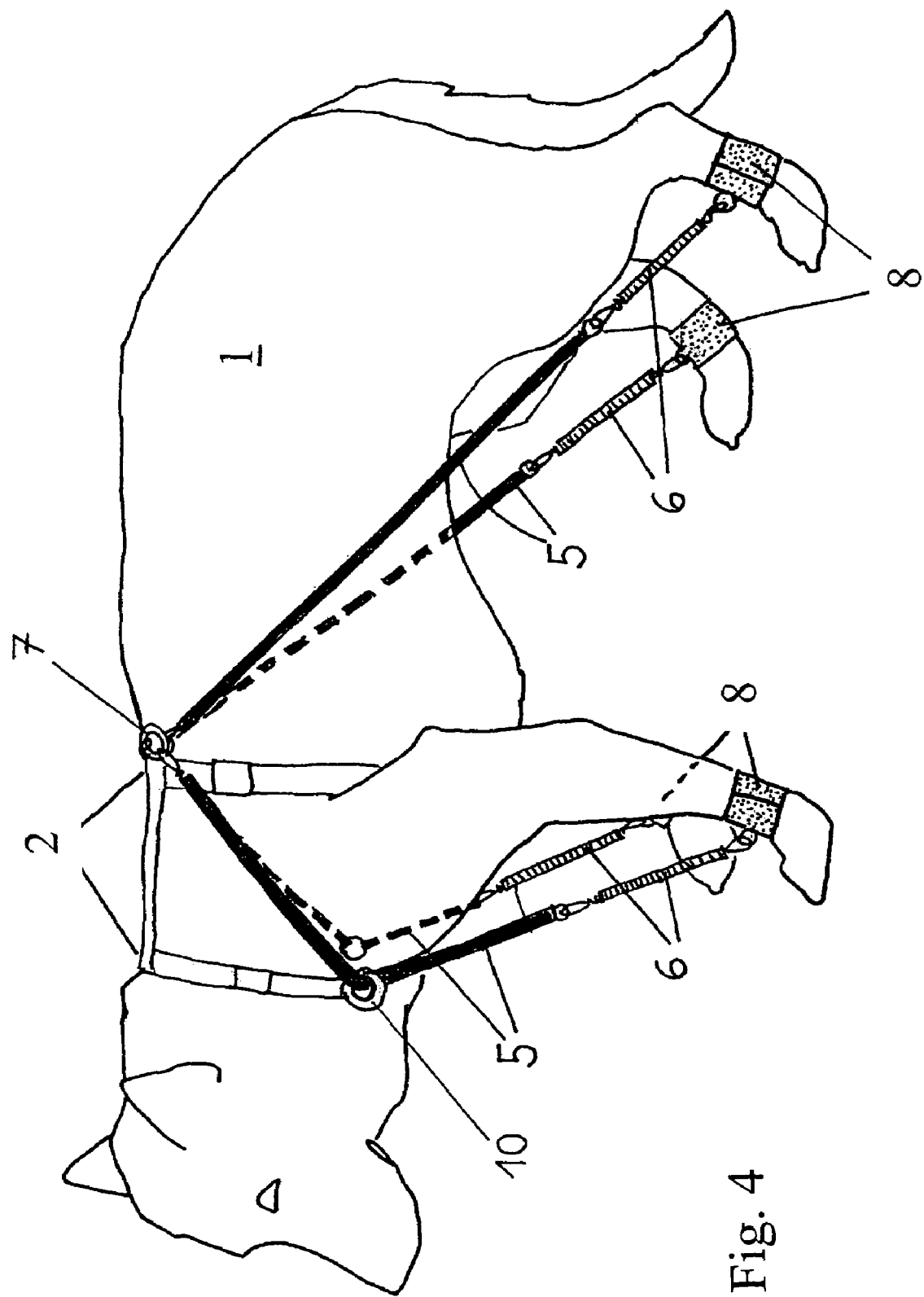
Figure 5:
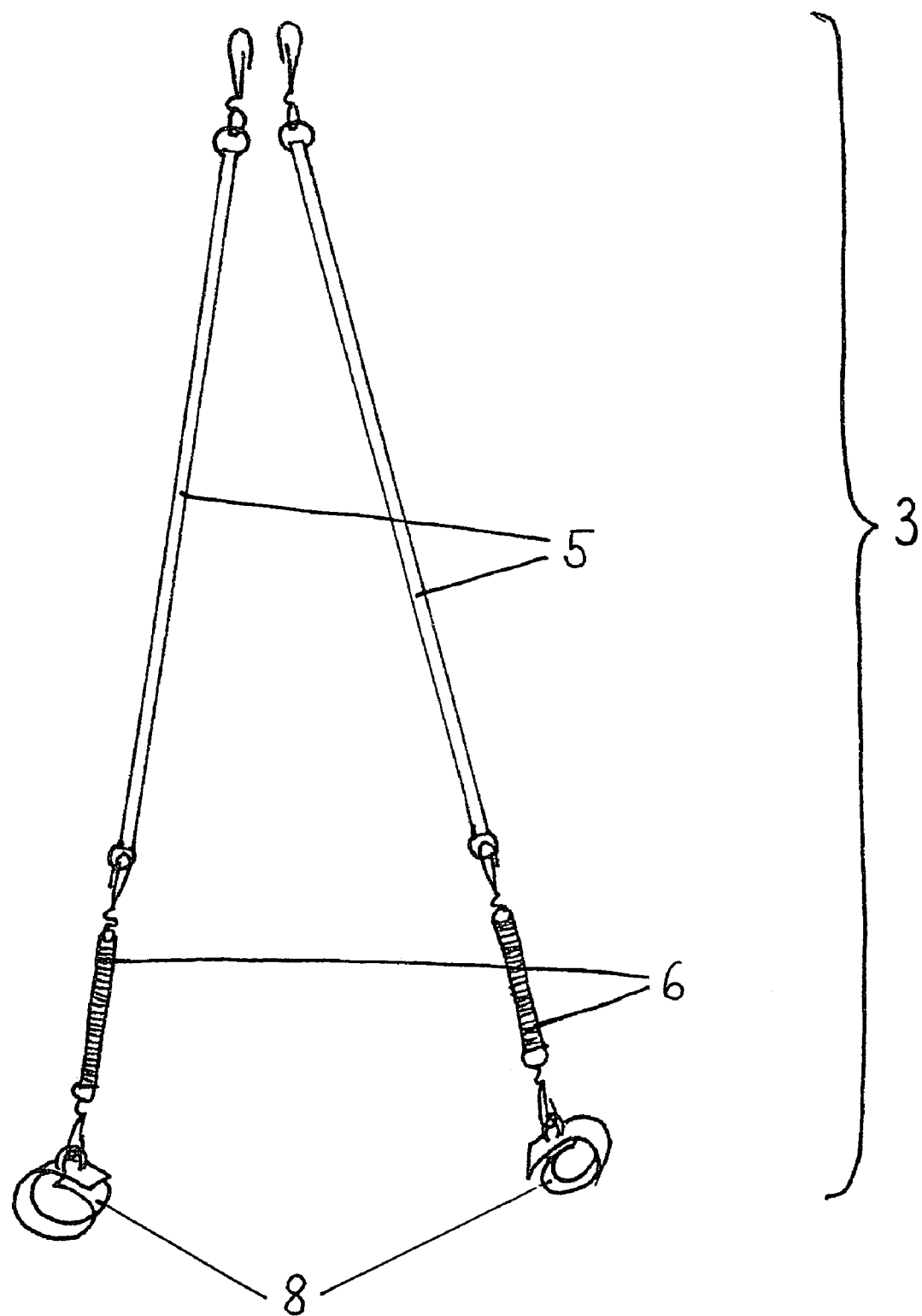
Figure 6:
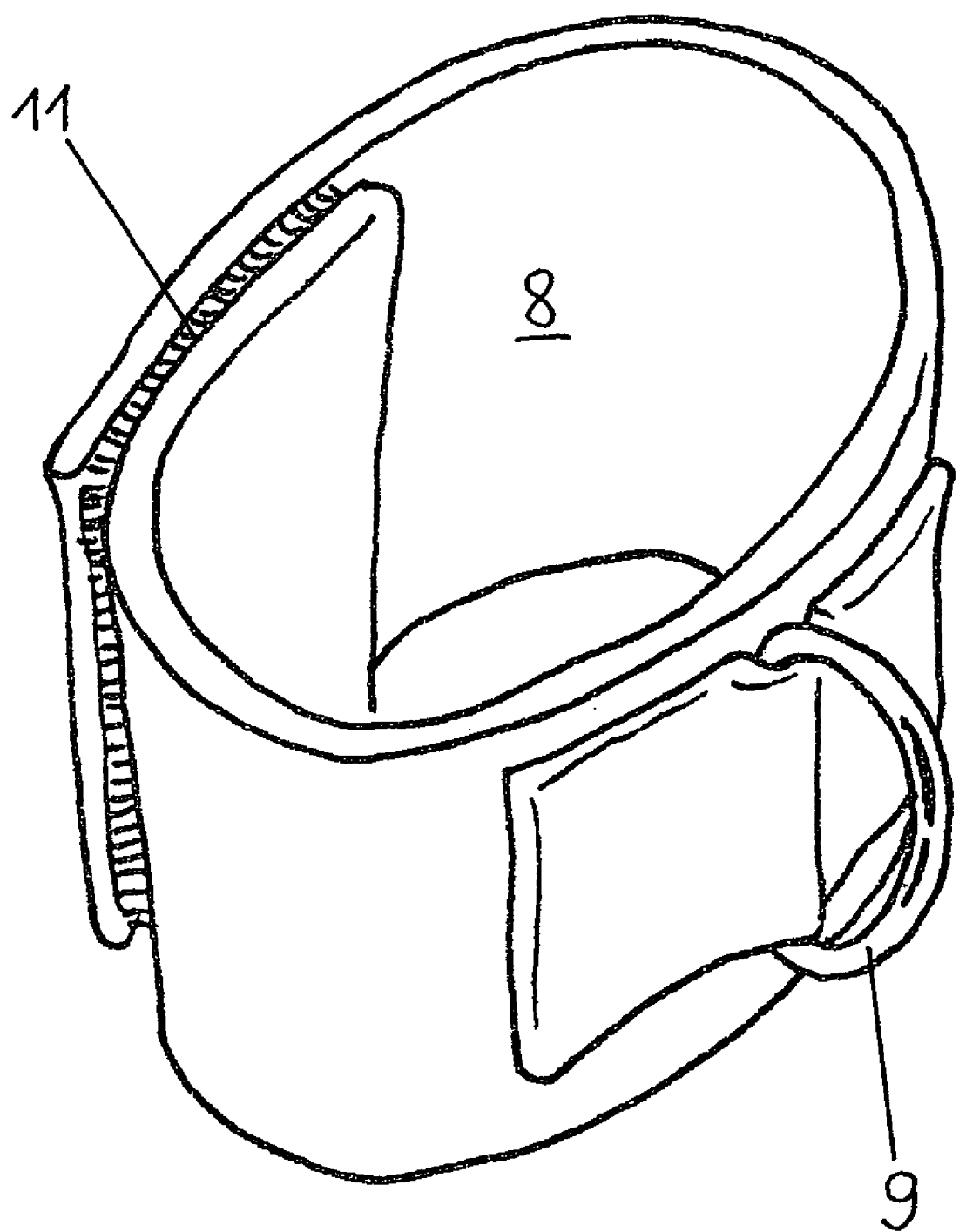

The invention is further explained below by means of drawings. In the drawings,

FIG. 1 shows a side view of a dog with an orthopedic device according to the invention on both rear legs, FIG. 2 shows a variant of the orthopedic device according to the invention, also in a side view, FIG. 3 shows a side view of the dog with an orthopedic device according to the invention on both front legs, FIG. 4 shows a side view of a dog with an orthopedic device according to the invention on all four legs, FIG. 5 shows a top view of a pair of orthopedic devices according to the invention, and FIG. 6 shows a foot cuff according to the invention.

As is apparent from the figures, a dog I being treated wears a chest harness 2, which can be of the usual type, but also specially adapted for use with the aid according to the invention. In the variant according to FIG. 1, two orthopedic aids 3 are attached to the chest harness 2, one each for one of the two rear legs 4 of the dog 1 being treated. The orthopedic aids 3 consist either of an elastic band in its entire length, for example, a rubber band, or, as shown, an essentially unstretchable section 6 and an elastic band 5. At least one metal ring 7 is situated on top of the chest harness. If several are provided, one can be fastened in the center, on the withers, and the others at a spacing preferably of about 4 cm to the left and right of it on the chest harness. This permits maximal variance of the rubber tension support.

The orthopedic aid 3 is fastened with one end, the front end, to chest harness 2 in the central or corresponding side ring. This can occur through a loop, a snap link, or another connection that is common in belts and harnesses. The other rear end of the device 3 is fastened to the ankle of the corresponding leg 4. A special supporting sheath of the dog leg in this area is preferably provided to avoid friction and chafing. This sheath 8 can be part of the device according to the device 3 or the device 3' fastened to fit with it, for example, via a ring 9, a snap link, or the like.

The length of the orthopedic device 3 is preferably adjustable, in order to be adapted to animals of different size. The tension behavior is preferably also adjustable, which is only possible if the device 3 does not consist of an elastic material over its entire length, but has a section that imparts elasticity to it.

The basis for calculation of the length of the device represents any band dimension x, which is measured from the selected ring 7, 7' on the back piece of the chest harness 2 or a chest belt or collar 2' up to the front of the middle front paw, just beneath the carpal joint, or the front of the middle rear paw, just beneath the ankle joint. Calculation of the length of the device is apparent from the following formula:

Band dimension: x;

Length of the elastic part e in the unstretched state: $e=0.5x$;

Length of the non-elastic intermediate piece u: $0.17x<u<0.33x$, preferably $0.19x<u<0.31x$. The missing length in x is achieved by the "bias", through which the device acts.

The length "u" of the non-elastic intermediate piece then averages 0.25x, but, depending on the usage conditions, can be replaced with longer or shorter non-elastic parts. Depending on the severity of the disease or the performance capability of the patient, specifically the affected extremity, the change in length of the intermediate piece lies within the limits $u=x/4\pm(0.25-0.30)x/4$.

During use on one or both front extremities, as shown in FIG. 3, the device 3 is pulled through a side ring 10, fastened on the chest harness 2 at the height of the shoulder joint on the same side, in order to be able to divert the tension acting on the middle front paw. Measurement of length "x" also occurs through the side ring 10, calculation of the lengths of the individual sections 5, 6 of the device is not altered by this deflection.

In the depicted practical example, particularly FIG. 1, fastening of the orthopedic device 3 on the neck of the animal on its back (withers) is shown, which generally is preferred to fastening relatively farther down, laterally on the chest harness, on the one hand, because, rotation of the leg outward is more strongly suppressed by this than in the lateral fastening (not shown), and, on the other hand, because a stronger upward directed tension of the device is achieved.

FIG. 2 shows a type of combination, in which the band 3 supports lifting and band 3' supports forward movement. For this purpose, a connection element can be provided between the two front ends of the orthopedic device 3, through whose (adjustable) lengths the spacing to the neck of the dog is established.

From an examination of FIGS. 1, 3, and 4, on the one hand, and FIG. 2 on the other hand, it is obvious that the chest harness 2 can have a variety of shapes, and can also be replaced by a chest belt. Whether this chest belt is combined with a collar, as in FIG. 2, is a matter of preference of the animal and master.

Naturally, a special chest harness can be used instead of an ordinary chest harness 2, in which several fastening points are provided for the front end of the device 3. In this type of chest harness, the spacing between the actual chest belt and the collar can be made variable, not only adaptable to differently built dogs, but also to have a stronger variation possibility for fastening of the orthopedic device, in order to optimize the therapeutic purpose and to adapt it to the course of therapy. In this context, it is quite possible to apply an auxiliary belt to chest harness 2, which runs behind the chest belt and permits fastening of the orthopedic device 3 farther back on the animal. A significantly steeper tension on leg 4 of the dog can be achieved by this.

FIG. 4 shows the use on all four extremities, as is necessary in severe cases.

FIG. 5 shows a pair of devices 3 for simultaneous use on a leg pair; the non-elastic section 6 and the elastic regions 5 are connected by snap links in the depicted practical example, but naturally other solutions are possible. The leg cuffs 8 are shown in closer detail in FIG. 6 in a preferred variant: a soft band is easily and precisely adjustable to the corresponding legs by means of a Velcro closure 11 and provided with a ring 9 that permits easy connection to band 3 by means of snap links, loops, etc.

Experiments with the device according to the invention have shown that the movement willingness of animals equipped with the orthopedic aid increases sharply, so that they exhibit significant muscle buildup. After two to three weeks of consistent use, even without the attached device, a significantly increased motion process is found in comparison with the beginning of therapy.

Whether a correction of the hip joint actually occurs during early use, as during the application of splay plaster in babies in human medicine, still cannot be verified, but appears to be within the realm of the possible.

The invention is not restricted to the depicted practical example. The chest harness can be designed differently or run differently on the animal; also, a variety of fasteners can be used for band 3 on the chest harness 2. Protective devices (bandages, gauzes, sock-like sleeves, etc.) can be applied to the leg or flanks to prevent wounds and a variety of other measures can be taken.

Rubber bands, as used in human medicine in orthopedics and, in special cases, in dogs, can be used. Also, metal coil springs, as are commonly used with horses or cattle and which must be inserted into sleeves because of the hazard of pinching—as well as all other rubber-elastic, elongated structures that are easy to clean—can be considered. The choice of spring strength can be determined by a few experiments on the corresponding subject and can be easily adjusted to the corresponding constitution of the patient by lengthening or shortening the elastic area 5 and/or the non-elastic area 6.

The invention was explained with reference to the treatment of dogs, but, as mentioned in the introduction, can also be successfully used in hoofed animals and camels.

The invention claimed is:

1. An orthopedic training and therapeutic device for an animal selected from dogs, hoofed animals, and camels, the device comprising:
   a band member comprising a first end, a second end, and an elastic portion; and
   a chest harness configured to be worn by the animal and comprising a linkage point proximate one of a withers and a side of the animal;
wherein the first end of the band member is fastened to one of a middle rear paw and a middle front paw of an extremity to be treated, wherein the second end of the band member is fastened to the linkage point, wherein the elastic portion has an unstretched length approximately 0.5 times a biased length of the band member, and wherein the band member further comprises a non-elastic portion having a length approximately 0.17 times to 0.3 times the biased length of the band member.

2. The device according to claim 1, wherein an unstretched length of the band member is at least substantially equal to a distance between the linkage point and a fastening point of the first end to the extremity to be treated when a foot of the extremity is in a raised position.

3. The device as in any one of claims 1 and 2, wherein the chest harness comprises a plurality of linkage points proximately disposed about the withers.

4. The device according to claim 3, further comprising at least two band members, wherein the first ends of the at least two band members are fastened to the extremity to be treated, and wherein the second ends of the at least two band members are fastened to different linkage points on the chest harness.

5. The device according to claim 1, wherein the biased length of the band member is approximately equal to a distance between the linkage point and one of a front side of the middle front paw immediately beneath a carpal joint thereof and a front side of the middle rear paw immediately beneath an ankle joint thereof.

6. The device according to claim 1, wherein the band member is slack during normal gait of the animal when a foot of the treated extremity is in a raised position.

7. The device according to claim 1, wherein the chest harness comprises a plurality of linkage points having different spacings with respect to a neck portion of the animal.

8. The device according to claim 7, further comprising two band members fastened to each middle rear paw, wherein the second ends of the band members corresponding to each middle rear paw are fastened to different linkage points on the chest harness.

* * * * *